United States Patent [19]
Griffin

[11] Patent Number: 5,378,974
[45] Date of Patent: Jan. 3, 1995

[54] VIBRATION DAMPING SYSTEM

[75] Inventor: Steven F. Griffin, Atlanta, Ga.

[73] Assignee: The United States of America as represented by the Secretary of the Air Force, Washington, D.C.

[21] Appl. No.: 88,965

[22] Filed: Jul. 2, 1993

[51] Int. Cl.[6] ............................................. B64C 17/06
[52] U.S. Cl. ................................... 318/649; 310/51
[58] Field of Search .................. 318/611, 649; 310/51

[56] References Cited

U.S. PATENT DOCUMENTS

| | | | |
|---|---|---|---|
| Re. 33,028 | 8/1989 | Simpson | 137/82 |
| 4,080,636 | 3/1978 | Ravizza | 360/77 |
| 4,229,692 | 10/1980 | Graeme | 324/62 |
| 4,633,982 | 1/1987 | Swigert | 318/460 X |
| 4,929,874 | 5/1990 | Mizuno et al. | 318/649 X |
| 5,156,370 | 10/1992 | Silcox et al. | 318/649 X |
| 5,251,264 | 10/1993 | Tichy | 381/173 |

Primary Examiner—William M. Shoop, Jr.
Assistant Examiner—Brian Sircus
Attorney, Agent, or Firm—William G. Auton

[57] ABSTRACT

The smart patch includes two piezoceramic actuators which operate on both sides of a structural member at the same fixed distance from the neutral axis to produce a bending method. The piezoceramic actuators are configured such that when subjected to a voltage, one shrinks and one expands. This provides the moment. One piezoceramic could also be used to provide half the moment provided that it was the same distance from the neutral axis of the structural member. There is a piezoceramic sensor that senses the vibrational mode to be suppressed. Finally there are control electronics that consist of a charge amplifier, a two pole low pass filter and a bridge amplifier. All of these elements are integrated into one entity.

4 Claims, 3 Drawing Sheets

VIBRATION DAMPING SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates to structure stabilizing systems, and more particularly to a vibration damping system for removing vibrations from a structure using piezoceramic actuators.

Vibration has historically been recognized as a problem which can produce a variety of adverse effects in equipment. Special precautions are needed to protect machine elements of air-borne laser tracking systems. The task of damping such undesirable vibration in the structure of the optical bench, while minimizing the impact on the existing design, has been alleviated, to some extent, by the following U.S. Patents, which are incorporated herein by reference:

U.S. Pat. No. 2,443,471 issued to Mason on 15 Jun. 1948;

U.S. Pat. No. 2,964,272 issued to Olson on 13 Dec. 1960;

U.S. Pat. No. 3,464,657 issued to Bullard on 2 Sep. 1969;

U.S. Pat. No. 3,703,999 issued to Forys et al on 28 Nov. 1972;

U.S. Pat. No. 4,795,123 issued to Forward on 3 Jan. 1989; and

U.S. Pat. No. 4,849,668 issued to Crawley et al.

All of the references cited above disclose systems for controlling mechanical vibration. The Mason reference discloses a damping assembly which uses a pair of piezoelectric crystal plates as a damping means. The approach of applying dynamically responsive damping elements is superior to mechanical mounting solutions such as springs, dash pots and other vibration absorbing mountings.

The Olson and Bullard references provide a vibration controlling apparatus containing a vibration sensing element, an amplifier, and a driving element. The driving element translates the amplified electrical signal into mechanical force to compensate for vibration.

Crawley et al teach that problems associated with the encapsulation and embedment of piezoceramic elements in a conductive matrix may be resolved by selecting a polymide material as insulation and enshrouding the elements with such material using a hard adhesive resin. As indicated in col. 1, lines 36–38, the use of piezoelectric elements for the purpose of electrically controlling resonance modes has been practiced on a macro scale without any consideration being given to micro scale or miniaturization. In this regard, note the particular embodiments set fourth in col. 2, lines 56–59. Crawley et al are clearly devoid of any teaching that the piezoelectric elements together with the sensor and control elements can be integrated in a miniaturized patch with little or no interface requirements, thereby opening the door to spacecraft application. The present problem requires a vibration damping system capable of responding to components of vibration produced by both acceleration as well as velocity of the host aircraft and neither of the above-cited references accomplish both velocity and acceleration nulling.

The Forys et al reference discloses a wideband stabilizing system for stabilizing cameras on moving vehicles. The stabilizing system includes a mounting system which houses the camera, as well as damps motion induced vibration. However, for the present problem, it is preferred to use the existing optical bench, rather than construct a new platform. Therefore, a vibration damping system is needed which may be attached to existing structures, as suggested by the Forward patent.

Much attention in past vibration suppression efforts has been given to the encapsulation and subsequent embedment of piezoceramics and other materials as actuators in composite materials. These actuators were used in conjunction with embedded sensors to perform active vibration control. There has been little attempt so far at miniaturizing the power and control electronics associated with the vibration control or incorporation of all components into a modular, self-contained entity-smart patch. Also, in past efforts, the assumption has been made that from +200 to +400 volts are readily available. This will probably not be the case on a spacecraft where the eventual size of the smart patch will be bounded by at least three variables—cost, volts required and volume available.

The preceding discussion indicates that there is a need for vibration suppression and shape control of structures using bonded piezoceramic sensors and actuators in conjunction with miniaturized control electronics. The present invention is intended to satisfy that need.

SUMMARY OF THE INVENTION

The present invention is a damping device for removing vibrations from structure with minimum impact on their design and operation.

The "smart patch" invention is concerned with electronic vibration suppression and shape control of precision instruments on vibrating platforms, e.g., commercial satellites, telescopes. Mechanically, the "smart patch" consists of 2 piezoceramic actuators which are bonded to both sides of a structural member at the same fixed distance from the neutral axis. The configuration is such that one actuator shrinks while the other actuator expands when subjected to a voltage, thereby producing a bending moment. The actuators are used in conjunction with a piezoceramic sensor that senses the vibrational mode to be suppressed as well as control electronics comprising a charge amplifier, a two-pole variable frequency low-pass filter and a bridge amplifier.

Past vibration suppression efforts involved encapsulation and subsequent embedment of piezoceramics and other materials as actuators in composite materials. The actuators were used in conjunction with embedded sensors and assumed the availability of 200 to 400 volts. The present invention utilizes miniaturized power and control electronics associated with the vibration control and incorporation of all components into a modular, self-contained entity which utilizes a voltage differential that is in the same range as spacecraft voltages using four, rechargeable 8 volt batteries. The Phillips Lab has used the invention with great success. Until the invention was available, the power and control electronics occupied a volume of 4 to 5 orders of magnitude larger than the sensors and actuators themselves, making the technology inaccessible to spacecraft applications. Also, past efforts used wall plug power supplies in contrast to the invention's use of battery power.

Each damping element serves to dampen vibration on the structure at its attachment point in one plane only. Multiple damping elements can be placed on the complex structures to control vibrations of complex vibration modes. This placement method follows some logic as prior art.

It is a principal object of the present invention to dampen undesired vibrations in mechanical structures.

It is another object of the present invention to dampen vibrations in structures while minimizing the impact on their design and operation.

It is another object of the present invention to dampen vibrations over a small range of frequencies. Multiple damping elements can be used to dampen vibrations over a wide range of frequencies.

It is another object of the present invention to dampen components of vibrations produced by both acceleration as well as velocity.

These and other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a vibration damping system for removing undesired vibrations from mechanical structures. The impact on the design and operation of such structures is minimized through the use of a plurality of damping elements, each of which can be attached to the structure by a clamp, a tapped, threaded hole, glue joint or similar means.

Figure 1:
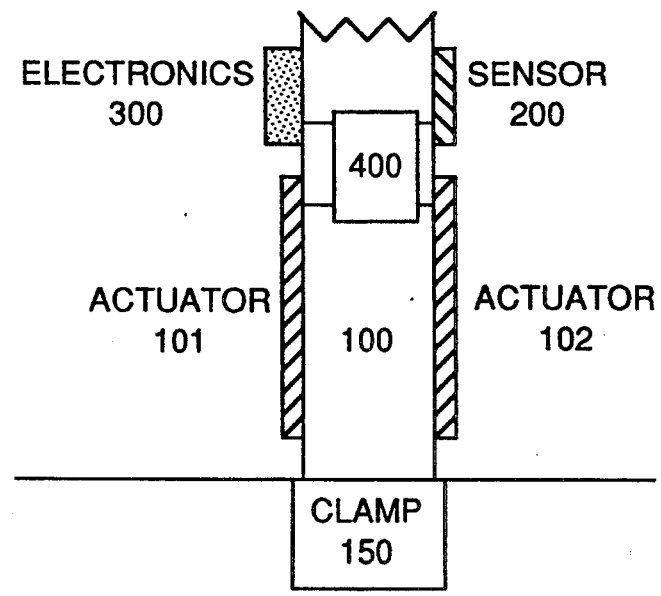
FIG. 1 is a schematic view of the vibration damping system of the present invention.
Figure 5:
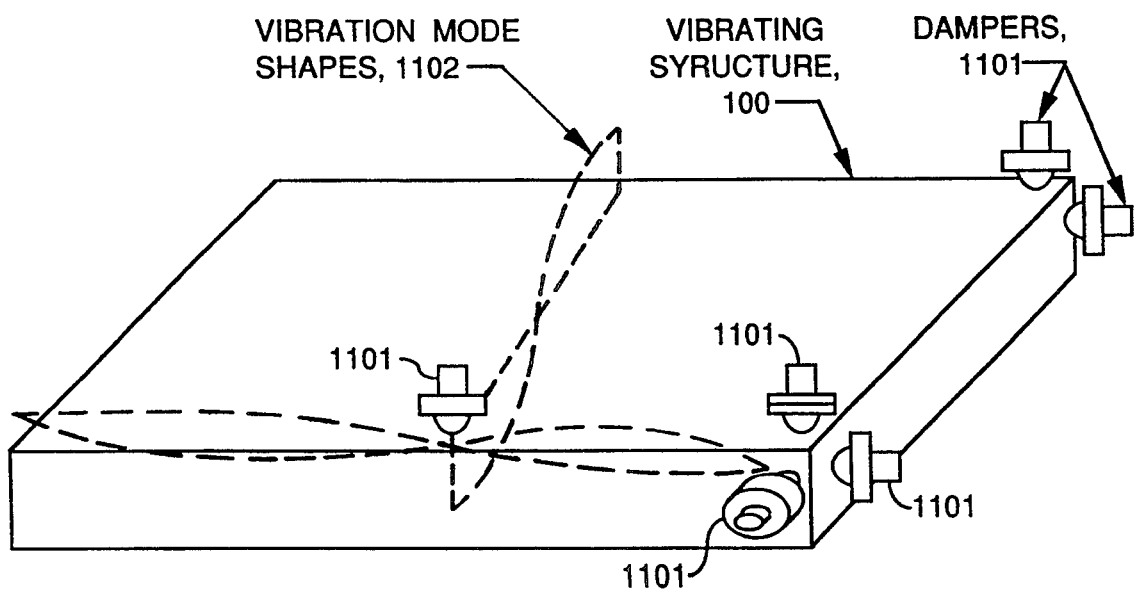
FIG. 5 is a prior art application usable by the present invention.

FIG. 1 is a schematic view of the system of the present invention, which depicts a plurality of actuator damping elements 101 and 102 attached to a structure 100. Each damping element damps vibration in one dimension along an axis formed by the element and its contact point with the structure. Damping of vibrations in three dimensions at a certain point is shown in FIG. 5, and is accomplished by attaching three sets of pairs of damping elements, with each set placed at a right-angle with the other two, around that point.

Also shown in FIG. 1, the smart patch consists of two piezoceramic actuators 101 and 102 which operate on both sides of a structural member 100 at the same fixed distance from the neutral axis to produce a bending method. The piezoceramic actuators are configured such that when subjected to a voltage, one shrinks and one expands. This provides the moment. One piezoceramic could also be used to provide half the moment provided that it was the same distance from the neutral axis of the structural member. There must also be a piezoceramic sensor 200 that senses the vibrational mode to be suppressed. Finally there are control electronics 300 that consist of a charge amplifier, a two pole low pass filter and a bridge amplifier. A mechanical schematic showing the relative size and position of each part of the smart patch is included in FIG. 1. A flow diagram shows the connections between each of the components in FIG. 2. FIG. 3 gives a detailed electrical schematic of the control electronics. Also, a picture of the device is provided and some results that show the vibrational behavior of the structural member with and without the smart patch active.

One new feature of this invention is the integration of all the parts into a small, self-contained package with little or no interface requirements. The patch runs on a voltage differential that is in the same range as spacecraft voltage using four, rechargeable 8 volt batteries.

The control law on this smart patch can very easily be changed to add actively induced stiffness or flexibility to a structure. This can make the structure behave in a controlled manner as a result of some requirement.

The bending motion of the actuators 101 and 102 upon the structural member can be produced in a variety of ways. Bending moment is produced by actuator on the surface of structural member 100 causing adjacent structure to shrink while actuator on other surface of structural member 100 causes adjacent structure to expand. The actuators are used in conjunction with a piezoceramic sensor that senses the vibrational mode to be suppressed as well as control electronics comprising a charge amplifier, a two-pole variable frequency low-pass filter and a bridge amplifier. Past vibration suppression efforts involved encapsulation and subsequent embedment of piezoceramics and other materials as actuators in composite materials. The actuators were used in conjunction with embedded sensors and assumed the availability of 200 to 400 volts. The present invention utilizes miniaturized power and control electronics associated with the vibration control and incorporation of all components into a modular, self-contained entity which utilizes a voltage differential that is in the same range as spacecraft voltages using four, rechargeable 8 volt batteries 400.

Figure 2:
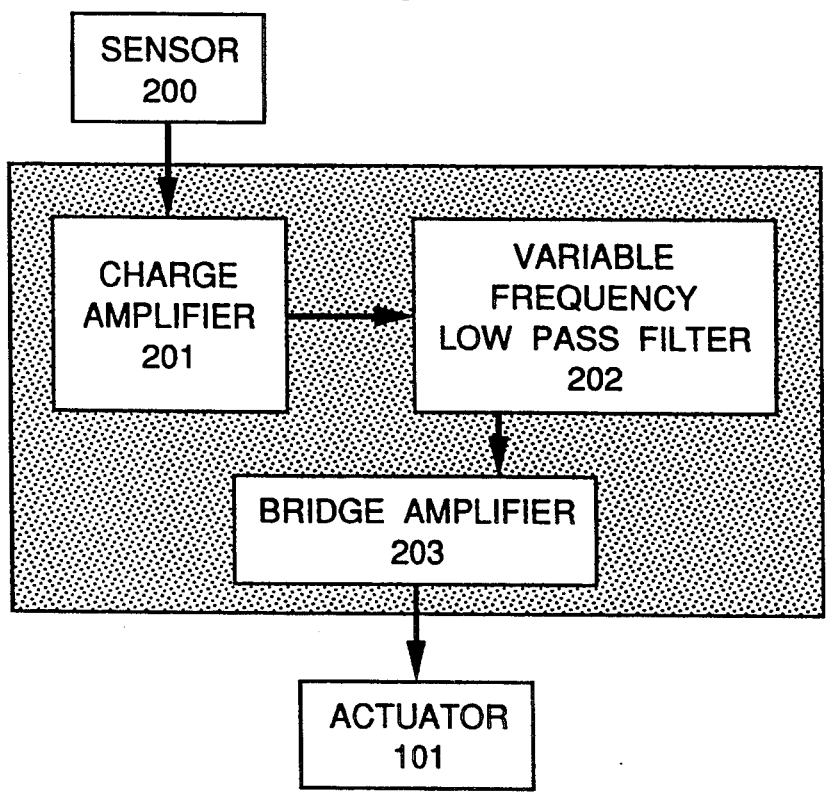
FIG. 2 is a flow diagram of a single pair of damping elements of the present invention.
Figure 3:
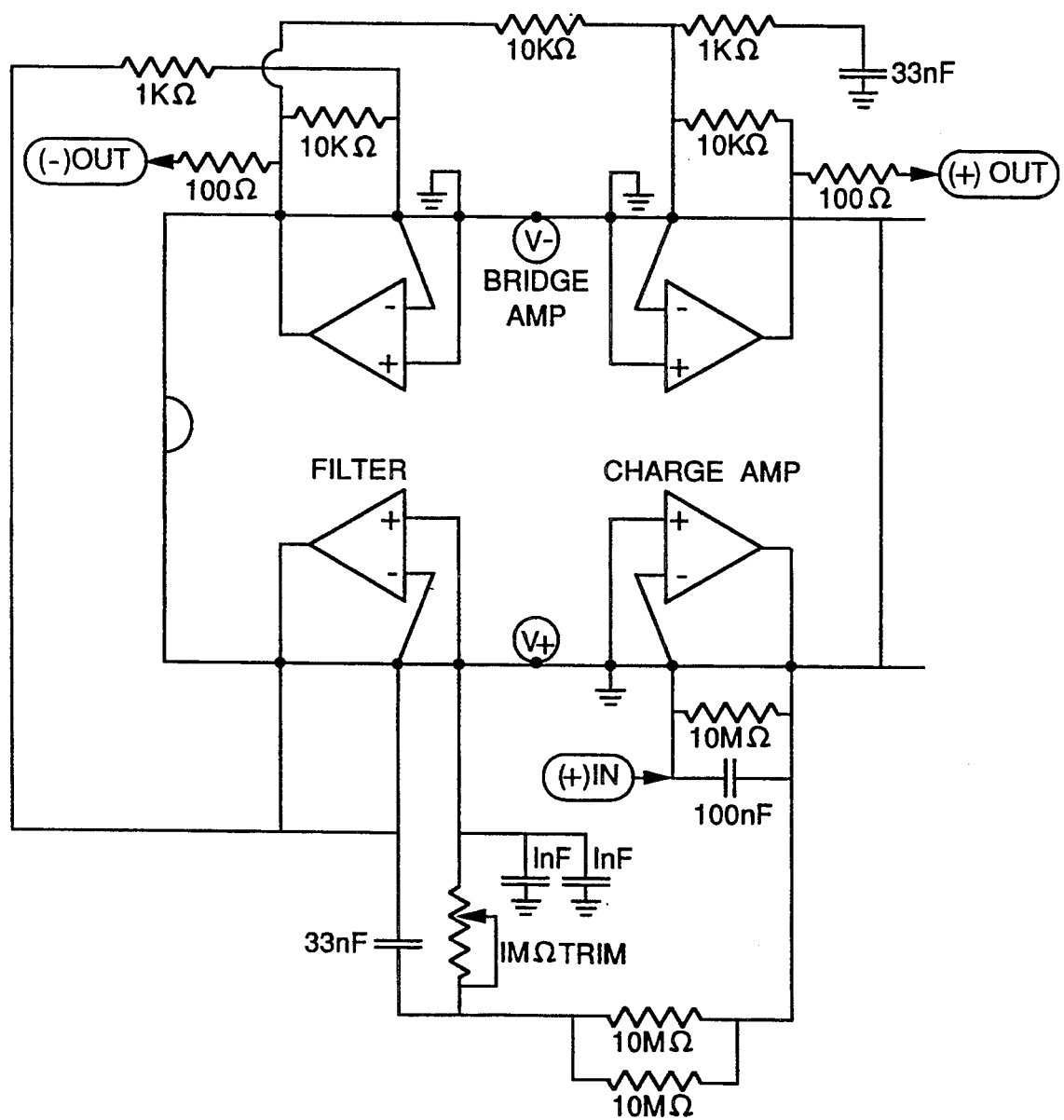
FIG. 3 is an electrical schematic of the control circuit of the damping element of FIG. 1.

FIG. 2 is a flow diagram of the operation of the present invention. As discussed above; the sensor 200 is also a piezoceramic element that is used to detect inplane strain.

Once the vibration has been sensed, the control electronics 300, of FIG. 1 converts the vibration signal of the sensor 200 into a control signal for the actuators 101 and 102 to counter the vibration. The block diagram of FIG. 2 shows that the control electronics 300 contains:
 a charge amplifier 201,
 a low pass filter 202,
 and a bridge amplifier 203.
Detailed activity of these elements is provided in FIG. 3 with a parts count listed below in Table 1.

TABLE 1

| PARTS COUNT | |
|---|---|
| Resistors | |
| 3 | 10 MΩ |
| 2 | 1 MΩ |
| 3 | 10 MΩ |
| 2 | 100 MΩ |
| 1 | 1 MΩ Trim |
| Capacitors | |
| 1 | 100 n F |
| 2 | 33 n F |
| 2 | 1 n F |
| 1 FOOT LONG WIRES | |
| (−) out | color 1 |

TABLE 1-continued

| PARTS COUNT | |
| --- | --- |
| (+) out | color 2 |
| (+) in | color 3 |
| ground | color 4 |
| V+ | color 5 |
| V− | color 6 |

Figure 4:
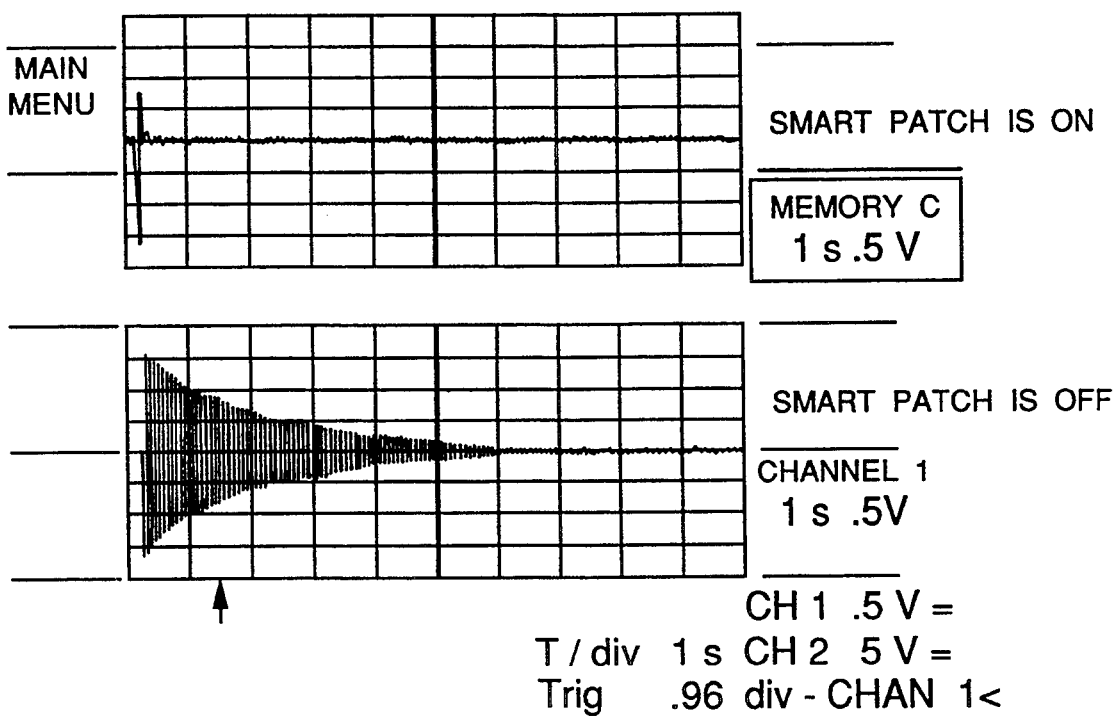
FIG. 4 is a chart comprising the vibration with the smart patch on and off.

FIG. 4 is a chart of the vibration of a structural member when the smart patch is on, and when the smart patch is off. When the smart patch is used with pairs of actuators, it can stop or counter vibration at one structural part of a structure.

While the invention has been described in its presently preferred embodiment, it is understood that the words which have been used are words of description rather than words of limitation and that changes within the purview of the appended claims may be made without departing from the scope and spirit of the invention in its broader aspects.

What is claimed is:

1. In combination with a mechanical structure which experiences motion-induced vibration, a vibration damping system comprising;
    means for electrically sensing the motion-induced vibration in the mechanical structure to produce thereby an electrical vibration measurement signal;
    a pair of piezoceramic actuators which are fixed on opposite sides of the mechanical structure at contact points and responding to composite motion command signals to counter all motion induced vibration at their contact points;
    a charge amplifier which is electrically connected with said sensing means to receive and amplify the electrical vibration measurement signal therefrom and which produces an amplified vibration measurement signal thereby;
    a variable frequency low pass filter which converts the amplified vibration measurement signal of the charge amplifier into a pair of motion command signals;
    a bridge amplifier which is electrically connected between the variable frequency low pass filter and the pair of piezoceramic actuators and which receives and amplifies the pair of motion command signals for the pair of piezoceramic actuators; and
    an internal means for providing electrical power to said sensing means, said piezoceramic actuators, said charge amplifier, said low pass filter and said bridge amplifier,
    wherein said sensing means and said pair of piezoceramic actuators is powered using four 8 volt batteries as said providing means.

2. A vibration damping system, as defined in claim 1, wherein each of said sensing means comprises a piezoceramic sensor which is fixed to said mechanical structure near said contact points to measure the motion-induced vibration at the contact points.

3. In combination with a mechanical structure which experiences motion-induced vibration, a vibration damping system comprising:
    means for electrically sensing the motion-induced vibration in the mechanical structure to produce thereby an electrical vibration measurement signal;
    a pair of piezoceramic actuators which are fixed on opposite sides of the mechanical structure at contact points and responding to composite motion command signals to counter all motion induced vibration at their contact points; and
    a means for electrically converting the electrical vibration measurement signal of the sensing means into the composite motion command signals for the pair of piezoceramic actuators, wherein said converting means, said sensing means and said pair of piezoceramic actuators is powered using four 8 volt batteries.

4. In combination with a mechanical structure which experiences motion-induced vibration, a vibration damping system comprising;
    means for electrically sensing the motion-induced vibration in the mechanical structure to produce thereby an electrical vibration measurement signal wherein each of said sensing means comprises a piezoceramic sensor which is fixed to said mechanical structure near said contact points to measure the motion-induced vibration at the contact points;
    a pair of piezoceramic actuators which are fixed on opposite sides of the mechanical structure at contact points and responding to composite motion command signals to counter all motion induced vibration at their contact points; and
    a means for electrically converting the electrical vibration measurement signal of the sensing means into the composite motion command signals for the pair of piezoceramic actuators, wherein said converting means, said sensing means and said pair of piezoceramic actuators is powered using four 8 volt batteries.

* * * * *